United States Patent
Winston

(12) United States Patent (10) Patent No.: US 6,637,428 B2
(45) Date of Patent: Oct. 28, 2003

(54) COLLAPSIBLE LIGHT CONCENTRATION DEVICE

(75) Inventor: Roland Winston, Chicago, IL (US)

(73) Assignee: Solar Enterprises International, LLC, Chicago, IL (US)

( * ) Notice: Subject to any disclaimer, the term of this patent is extended or adjusted under 35 U.S.C. 154(b) by 0 days.

(21) Appl. No.: 09/873,503

(22) Filed: Jun. 4, 2001

(65) Prior Publication Data

US 2002/0179085 A1 Dec. 5, 2002

(51) Int. Cl.[7] .................................................. F24J 2/10
(52) U.S. Cl. ........................ 126/692; 126/694; 126/696; 126/627
(58) Field of Search ................................. 126/692, 694, 126/696, 702, 682, 684, 624, 627, 651, 634, 701; 136/245, 246

(56) References Cited

U.S. PATENT DOCUMENTS

| | | | | |
|---|---|---|---|---|
| 4,281,644 A | * | 8/1981 | Chiles | 126/684 |
| 4,304,218 A | * | 12/1981 | Karlsson | 126/692 |
| 4,331,503 A | * | 5/1982 | Benjamin | 126/675 |
| 4,425,907 A | * | 1/1984 | Younghouse | 126/685 |
| 4,442,828 A | * | 4/1984 | Takeuchi et al. | 126/681 |
| 4,475,536 A | * | 10/1984 | Dame | 126/696 |
| 4,538,886 A | * | 9/1985 | Townsend et al. | 126/684 |
| 6,363,928 B1 | * | 4/2002 | Anderson, Jr. | 126/573 |

FOREIGN PATENT DOCUMENTS

| | | | | |
|---|---|---|---|---|
| DE | 25 58 767 A | * | 7/1977 | |
| EP | 0 009 012 A | * | 3/1980 | |
| JP | 10-311609 A | * | 11/1998 | |

\* cited by examiner

*Primary Examiner*—Henry Bennett
*Assistant Examiner*—Josiah C. Cocks
(74) *Attorney, Agent, or Firm*—Michael D. Rechtin; Foley & Lardner

(57) ABSTRACT

A collapsible light collection and/or transmission device having an axis of symmetry. The device includes opposing first and second body portions each having a curved inner reflective surface and an outer surface. The first body portion is pivotally coupled to the second body portion along the axis of symmetry. The present invention further includes a collapsible solar collector for collecting solar rays. The collector includes first and second body portions each having an inner reflective surface, an outer surface, a proximal end and a distal end. The collector is positionable between at least a first operative position, wherein the distal ends of the first and second body portions are separated, and a second substantially closed position, wherein the distal ends of the first and second body portions are positioned substantially adjacent to one another and the first and second body portions substantially face one another.

19 Claims, 4 Drawing Sheets

COLLAPSIBLE LIGHT CONCENTRATION DEVICE

FIELD OF THE INVENTION

The present invention relates generally to a collapsible device for the collection of light, including solar radiation, and even controlled transmission of light. More particularly, the present invention relates to a collapsible, portable and multi-positionable light transmission device for collecting light for operating as a furnace.

BACKGROUND OF THE INVENTION

Light transmission devices for collecting or emitting light, including solar radiation, are well known. Such devices are typically large structures configured for permanent mounting to a surface or a building. Solar transmission devices are typically either non-tracking stationary structures or tracking structures adapted for following the movement of the sun across the sky. Many light transmission devices further include reflective surfaces and either a tubular light source or a tubular radiation absorber mounted adjacent to the reflective surfaces for emitting or collecting radiation, respectively.

Existing light transmission devices have a number of drawbacks. Such devices are typically large, permanently mounted non-portable structures which are very difficult to reposition or to relocate from one site to another. Further, the reflective surfaces and the absorber or the light source of existing light transmission devices are typically continuously exposed to the environment making them susceptible to damage from severe weather, corrosive atmosphere or debris. Covering such devices during inclement weather or inhospitable conditions typically involves a series of difficult, time consuming steps.

Thus, there is a need for a light collection and/or transmission device for absorbing or emitting radiation that can be easily repositioned from an operative position to an inoperative position. What is needed is a light transmission device configured to enable a user to quickly and easily protect the reflective surfaces and the absorber or emitter from environmental hazards. It would further be advantageous to provide a light transmission device which can be easily stored or transported from one location to another. There is also a continuing need for a light collection or transmission device which can be releasably coupled to a surface or an existing building to enable a user to remove or reposition the device as needed.

SUMMARY OF THE INVENTION

The present invention provides a collapsible light collection and/or transmission device having an axis of symmetry. The device includes opposing first and second body portions each having a curved inner reflective surface and an outer surface. The first body portion is pivotally coupled to the second body portion along the axis of symmetry.

According to a principal aspect of one preferred form of the invention, a collapsible solar collector for collecting solar rays has a longitudinal axis. The collector includes first and second body portions each having an inner reflective surface, an outer surface, a proximal end and a distal end. The first and second body portions are pivotally coupled to one another. The collector is positionable between at least a first operative open position, wherein the distal ends of the first and second body portions are separated, and a second substantially closed position, wherein the distal ends of the first and second body portions are positioned substantially adjacent to one another and the first and second body portions substantially face one another.

This invention will become more fully understood from the following detailed description, taken in conjunction with the accompanying drawings described herein below, and wherein like reference numerals refer to like parts.

DETAILED DESCRIPTION OF THE PREFERRED EMBODIMENTS

Figure 1:
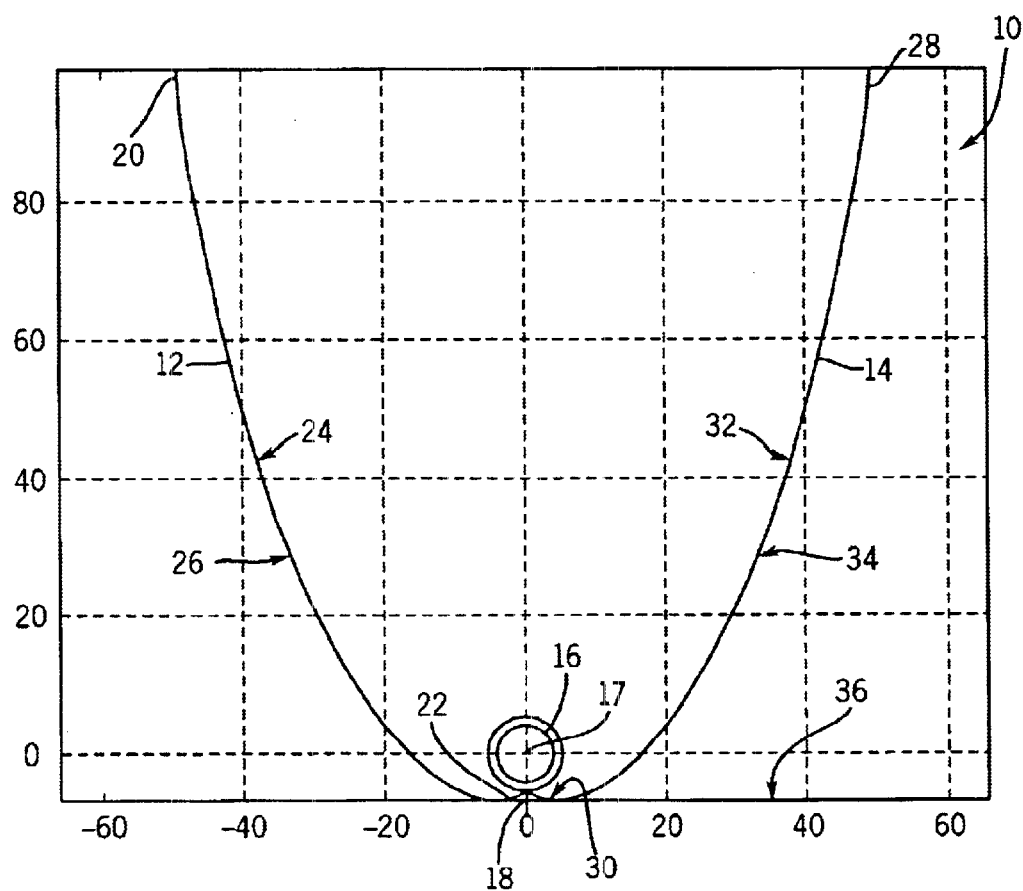
FIG. 1 is a cross-sectional view of a light collection and/or transmission device in an operative position in accordance with a preferred embodiment of the present invention.

Referring to FIG. 1, a light collection and/or transmission device, generally indicated at 10, is illustrated. The light collection and/or transmission device 10 (hereinafter "device 10") is a generally curved "clam-shell" type structure configured for placement on, or releasable coupling to, a surface or a supporting structure. In one preferred embodiment, the device 10 is configured to collect and absorb solar radiation or other light. In another preferred embodiment wherein light is outwardly transmitted, the device 10 is configured to emit and distribute light from a light source disposed at the location where a light concentrator would be positioned (see hereinafter). FIG. 1 illustrates the device 10 in an open operative position. In the preferred embodiment of FIG. 1, the device 10 can have a compound parabolic cross-sectional shape. In alternative preferred embodiments, the device 10 can be formed in other shapes, such as, for example, a parabolic shape, a trough shape, a spherical shape and a semi-cylindrical shape.

As shown in FIG. 1, the device 10 includes first and second body portions 12 and 14 and a tubular conduit 16. The first and second body portions 12 and 14 are reflector support members. The first and second body portions 12 and 14 are also preferably curved structures which are symmetrical with respect to each other about a longitudinal axis 18 of the device 10, also known as the axis of symmetry. The first and second body portions 12 and 14 are shaped appropriately to optimize the collection or emission (when transmitting) of radiation within the device 10. The first body portion 12 includes a first distal end 20, a first proximal end 22, a first reflective inner surface 24 and a first outer surface 26. The second body portion 14 includes a second distal end 28, a second proximal end 30, a second reflective inner surface 32 and a second outer surface 34. The first proximal end 22 is pivotally coupled to the second proximal end 28 along and about the axis 18. The first and second outer surfaces 26 and 34 are preferably configured for placement onto a surface 36 which is generally sloped to the direction of the arc of the sun across the sky. In alternative preferred embodiments, the first and second body portions 12 and 14 can include extensions or brackets (not shown) for suspended placement on a surface or removable attachment to a support structure (not shown). The first and second body portions 12 and 14 are made of a durable material, preferably metal. Other materials can also be used, such as, for example, ceramics, wood or thermoplastic materials. The first and second inner surfaces 24 and 32 are preferably formed from a layer of reflective material integrally connected to the first and second body portions 12 and 14, respectively.

In the concentrator form of the invention, the tubular conduit 16 is a housing which is coupled to at least one of the first and second body portions 12 and 14. The tubular conduit 16 is disposed adjacent to the first and second inner reflective surfaces 24 and 32, and extends longitudinally along the transmission device 10 substantially parallel to the axis 18. In one preferred embodiment, the tubular conduit 16 includes an absorber 17 for receiving radiation reflected from the first and second inner reflective surfaces 24 and 32 of the transmission device 10. When used with the absorber 17, the tubular conduit 16 can be removably coupled to a fluid circulation system (not shown) for transferring the energy absorbed by the absorber 17. The tubular conduit 16 is preferably made of glass. In a particularly preferred embodiment, the tubular conduit 16 is an evacuated tube which includes the absorber 17. The conduit 16 can also be made of other materials, such as, for example, metal.

Figure 2:
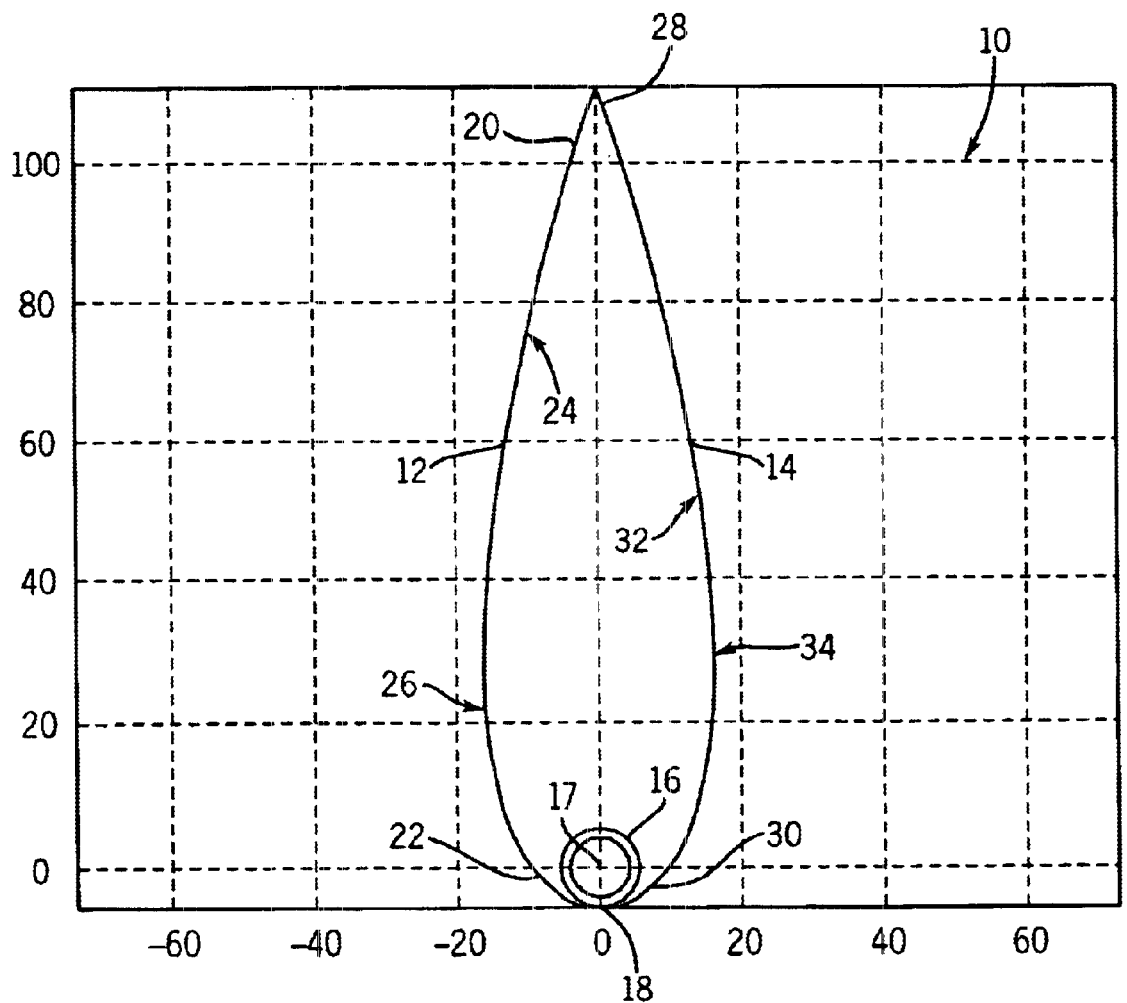
FIG. 2 is cross-sectional view of the light collection and/or transmission device of FIG. 1 shown in a closed, inoperative position.

The device 10 is positionable between at least one open, operative position and a closed, inactive collection position. FIG. 1 illustrates the transmission device 10 in an open operative position suitable for operation as a non-tracking solar collector, a light receiver or a light generator. In the open, operative position, the transmission device 10 has high solar angular acceptance. Additionally, the transmission device 10 is configured to be portable and suitable for placement in a substantially east/west direction, north/south direction or other direction as desired by the user. FIG. 2 illustrates the device 10 in the closed, inactive collection position. The closed position is obtained by collapsing or folding the first and second body portions 12 and 14 through movement of the first and second distal ends 20 and 28 of the first and second body portions 12 and 14 toward each other. The pivotal connection of the first and second proximal ends 22 and 30, and the spacing of the conduit 16 away from the first and second inner reflective surfaces 24 and 32 enables the first and second body portions 12 and 14 to collapse toward one another. The multi-positionable device 10 enables a user to quickly and easily close the transmission device 10 when it is not in use, or to protect the inner reflective surfaces 24 and 32 and the conduit 16 from inclement weather, debris or other foreign material. The closed position of the device 10 also facilitates its ready transportation and storage. The preferred symmetrical configuration of the first and second body portions 12 and 14 enables the first and second distal ends 20 and 28 to substantially contact one another when in the closed position, thereby substantially enclosing the radial surfaces of the conduit 16 and the first and second inner reflective surfaces 24 and 32.

Figure 3:
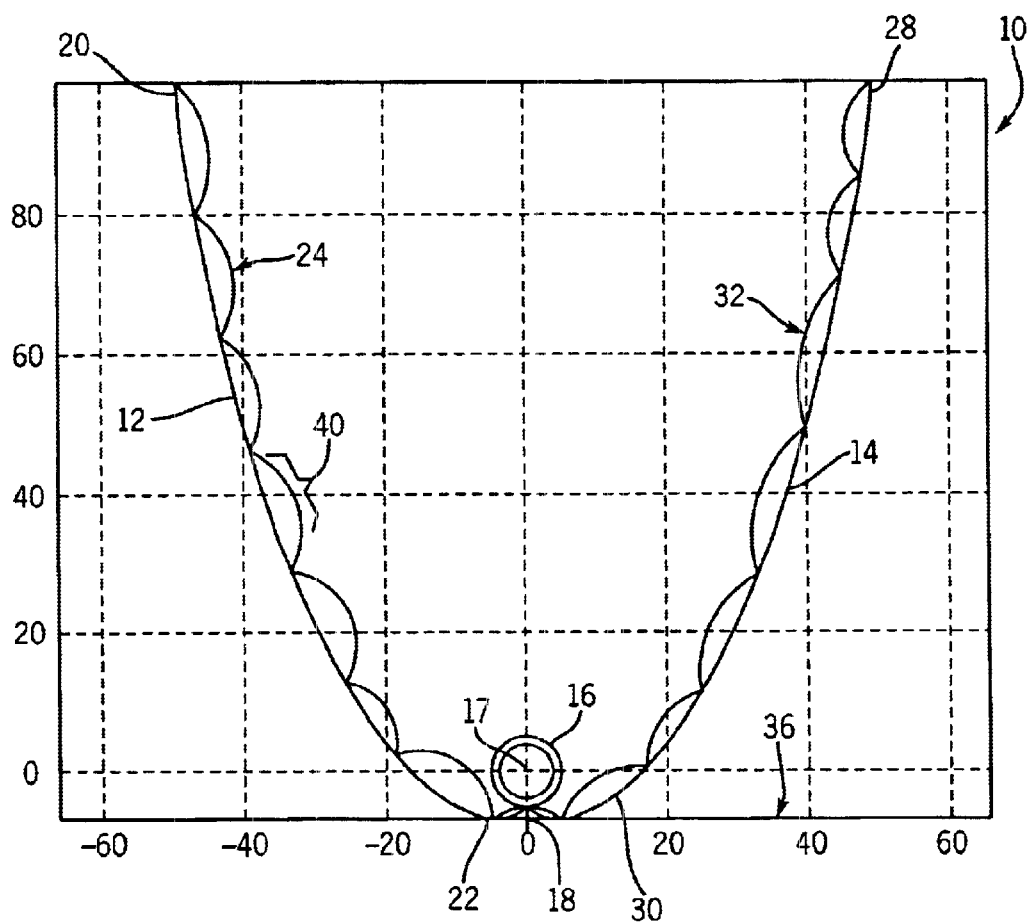
FIG. 3 is a cross-sectional view of a light collection and/or transmission device in accordance with an alternative preferred embodiment of the present invention.

FIG. 3 illustrates another preferred embodiment of the device 10 which includes a plurality of raised and recessed surfaces for producing a non-imaging, non-focusing device. In the preferred embodiment, of FIG. 3 the first and second inner reflective surfaces 24 and 32 each contain a plurality of corrugations 40. The corrugations 40 have smooth, curved surfaces which longitudinally extend along the first and second body portions 12 and 14 of the device 10. The corrugations 40 of the first and second body portions 12 and 14 are symmetrical about the axis 18, which provides the transmission device with unbroken longitudinal symmetry. In alternative preferred embodiments, the first and second inner reflective surfaces 24 and 32 can include jagged corrugations, angular corrugations, irregular corrugations, straight-line discontinuities, planar discontinuities, other generally broken symmetries or combinations thereof. Additionally, the corrugations or discontinuities can extend along the longitudinal axis 18, thereby producing a non-imaging reflector with translationally invariant variant broken symmetry structure on the first and second inner reflective surfaces 24 and 32. Alternatively, the corrugations or discontinuities can extend at one or more angles from the axis 18 thereby producing a non-imaging reflector with translationally variant broken symmetry structure on the first and second inner reflective surfaces 24 and 32.

Figure 4:
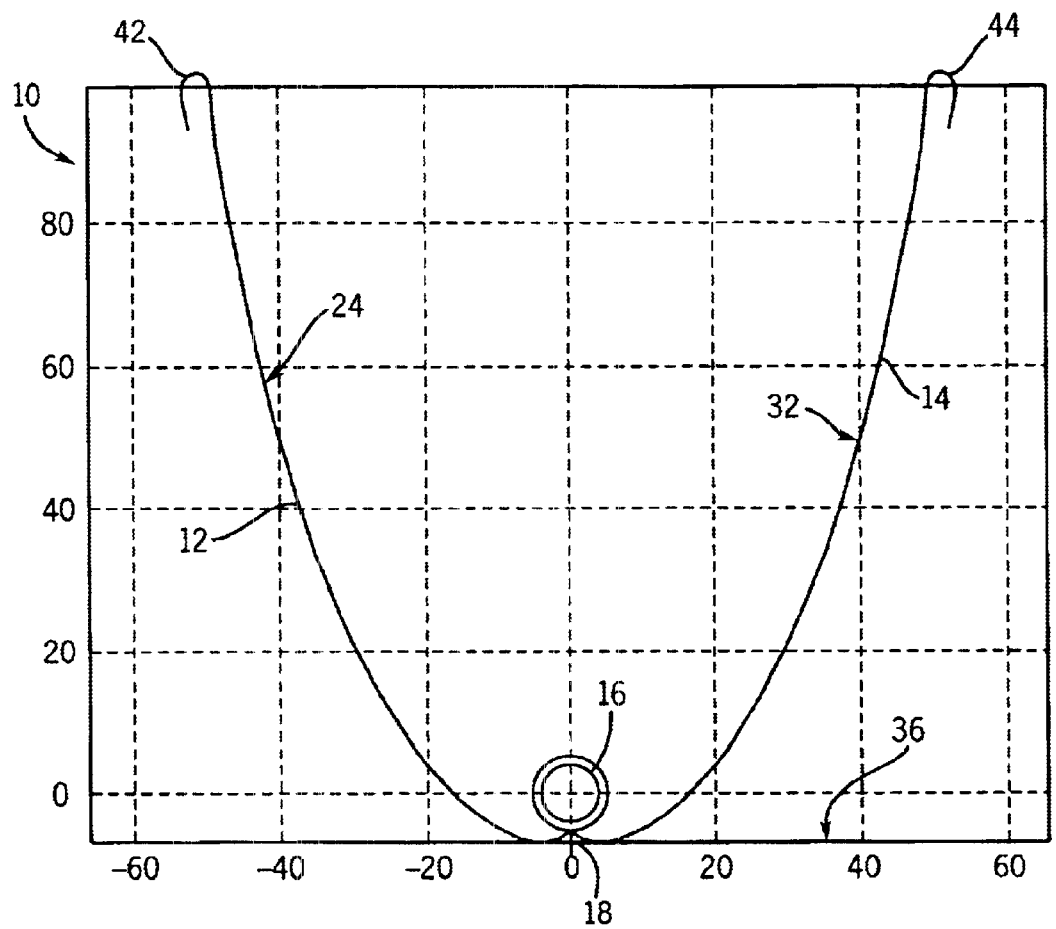
FIG. 4 is a cross-sectional view of a light collection and/or transmission device in accordance with another alternative preferred embodiment of the present invention.

FIG. 4 illustrates an alternative preferred embodiment of the present invention in which the first and second body portions 12 and 14 of the device 10 further include first and second handles 42 and 44 formed into the first and second distal ends 20 and 28, respectively. The handles 42 and 44 outwardly and downwardly extend from at least a portion of the first and second distal ends 20 and 28. The handles 42 and 44 are configured to facilitate positioning and transporting of the transmission device 10. In an alternative preferred embodiment, the handle can be a separate component connected to one or both of the first and second body portions 12 and 14. In another preferred embodiment, one or both of the first and second body portions 12 and 14 includes a recess for receiving a users hand.

In an alternative preferred embodiment, the tubular conduit 16 includes a light source for generating light for reflection off the first and second inner reflective surfaces 24 and 32. When used with a light source, the tubular conduit 16 can be removably connected to a power source (not shown). The first and second inner reflective surfaces 24 and 32 are configured to reflect and distribute light from the light source and the tubular conduit out away from the device 10. The collapsible and portable design of the device 10 enables a user to quickly position, set up and operate the device 10 as a light transmission device.

In a most preferred form of the invention, $\theta=12°$ which is desireable for all day operation and would best be adjusted as the seasons change. The angle $\emptyset=12°$ accommodates the gaps between the absorber 17 and the reflector (the surfaces 24 and 32). In this case the gap is the difference between a radius of 12 mm and R=3.8 cm (the radius of the absorber 17); $R_1=5$ cm, the radius of closest approach to the reflector surfaces 24 and 32. One can include an evacuated space between the absorber 17 and the reflector, but this is not required. Further the absorber 17 can be a metal with a heat pipe component. In the open position for the device 10 the aperture is about 50 cm. Thus a one meter long form of the device 10 has a 0.5 $m^2$ aperature and would collect almost 300–400 energy after losses.

While the preferred embodiments of the present invention have been described and illustrated, numerous departures therefrom can be contemplated by persons skilled in the art, for example, the transmission device 10 can be a spherical structure having two or more collapsible body portions. Additionally, the tubular conduit can be replaced with a spherical or non-tubular structure having either an absorber or a light generator. Therefore, the present invention is not limited to the foregoing description but only by the scope and spirit of the appended claims.

What is claimed is:

1. A collapsible light collection device configured for removable placement onto a support, the device comprising:

an absorber housing;

opposing first and second body portions forming reflector support members each having a curved inner reflective surface and an outer surface; and the first body portion pivotally coupled to the second body portion along an axis of symmetry and when the first and second body portions are in an open position an inflection inflection point is created which is disposed at the intersection of the left and right reflectors and the inflection point of the reflector support members makes tangential contact with the absorber housing.

2. The light collection device of claim 1 wherein each of the first and second body portions includes a proximal end and a distal end, and wherein the proximal ends of the first and second body portions are pivotally coupled to one another.

3. The light collection device of claim 1 further comprising a tubular conduit coupled to one of the first and second body portions and extending substantially parallel to the axis of symmetry.

4. The light collection device of claim 3 wherein the first and second body portions and the tubular conduit comprise at least one of a non-tracking solar collector and a radiation distributor.

5. The light collection device of claim 3 wherein the tubular conduit comprises one of a light source and an absorber.

6. The light collection device of claim 1 wherein the inner reflective surfaces of the first and second body portions comprise a compound parabolic shape.

7. The light collection device of claim 1 wherein the inner reflective surfaces of the first and second body portions comprises a non-focusing reflector shape.

8. The light collection device of claim 1 wherein the inner reflective surfaces of the first and second body portions include a plurality of raised surfaces and recessed surfaces selected from the group consisting of corrugations, discontinuities and combinations thereof.

9. The light collection device of claim 1 further comprising a handle coupled to at least one of the first and second body portions.

10. The light collection device of claim 1 wherein the first and second body portions when in a closed position have no contact other than the hinge point's tangential contact with the absorber housing at the bottom of the structure.

11. A collapsible solar collector for collecting solar rays and having a longitudinal axis, the device comprising:

an absorber housing;

first and second body portions forming reflector support members each having an inner reflective surface, an outer surface a proximal end and a distal end the first and second body portions being pivotally coupled to one another and when the first and second body portions are in an open position an inflection point is created which is disposed at the intersection of the left and right reflectors and the inflection point of the reflector support members makes tangential contact with the absorber housing; and the collector positionable between at least a first operative open position, wherein the distal ends of the first and second body portions are separated, and a second substantially closed position, wherein the distal ends of the first and second body portions are positioned substantially adjacent to one another and the first and second body portions substantially face one another.

12. The solar collector of claim 11 further comprising tubular conduit coupled to one of the first and second body portions and extending substantially parallel to the axis of symmetry.

13. The solar collector of claim 12 wherein the tubular conduit comprises an absorber.

14. The solar collector of claim 11 wherein the inner reflective surfaces of the first and second body portions comprise a compound parabolic shape.

15. The solar collector of claim 11 wherein the inner reflective surfaces of the first and second body portions comprises a non-focusing reflector shape.

16. The sol r collector of claim 11 wherein the inner reflective surfaces of the first and second body portions include a plurality of raised surfaces and recessed surfaces selected from the group consisting of corrugations, discontinuities and combinations thereof.

17. The solar collector of claim 11 further comprising a handle coupled to at least one of the first and second body portions.

18. The solar collector claim 11 wherein the first and second body portions are symmetrical about the axis.

19. The light collection device of claim 11 wherein the first and second body portions when in a closed position have no contact other than the hinge point's tangential contact with the absorber housing at the bottom of the structure.

* * * * *